C. G. SPENCER.
SYNCHRONIZING SYSTEM.
APPLICATION FILED JAN. 4, 1918.

1,333,000.

Patented Mar. 9, 1920.
2 SHEETS—SHEET 1.

UNITED STATES PATENT OFFICE.

CHARLES G. SPENCER, OF EAST ORANGE, NEW JERSEY, ASSIGNOR TO WESTERN ELECTRIC COMPANY, INCORPORATED, OF NEW YORK, N. Y., A CORPORATION OF NEW YORK.

SYNCHRONIZING SYSTEM.

1,333,000.   Specification of Letters Patent.   Patented Mar. 9, 1920.

Application filed January 4, 1918. Serial No. 210,255.

*To all whom it may concern:*

Be it known that I, CHARLES G. SPENCER, a citizen of the United States, residing at East Orange, in the county of Essex, State of New Jersey, have invented certain new and useful Improvements in Synchronizing Systems, of which the following is a full, clear, concise, and exact description.

This invention relates to synchronizing systems, and more particularly to systems for controlling the speed relation of a plurality of remotely situated rotary systems.

The principal object of this invention is to provide an improved organization of apparatus and system for automatically establishing a synchronous relation between the moving parts of a plurality of rotative systems, and for maintaining a condition of synchronism between such rotative systems.

The present invention may be readily applied to governing the operations of synchronizing various types of rotatory systems, among which may be mentioned: systems of synchronous multiplex telegraphy, switching systems for the control of remote signals, similar to the system described in United States patent application, Serial No. 48,213, filed August 31, 1915, and issued as Patent No. 1,251,363, Dec. 25, 1917, by Bancroft Gherardi, and for the synchronizing of electric generators, electric motors, etc.

Although this system is applicable to many different varieties of service, for convenience of description, the embodiment chosen for illustrating the features of this invention has been planned on the basis of an arrangement suitable for rendering automatic synchronizing service in connection with a system of synchronous multiplex telegraphy.

In connection with the usual transmitting, receiving, and multiplex distributer equipments commonly employed in synchronous telegraph systems, the present invention contemplates the use of electroresponsive devices in connection with the distributers, whereby, after the distributer motors at remote stations have been started, predetermined orders of current polarities will be established between the stations in a manner to control so-called phase-finding equipments through which the speed of the motors may be varied or governed to the extent that synchronism of the distributers one with another will be attained. The automatic phase-finding equipment of this invention is further adapted to be affected by incipient variations from an exact condition of synchronism to immediately respond and correct such variations before the service for which the distributers are employed would be disturbed, and, in case any unavoidable or direct cause should destroy the phase or synchronous relation of the various distributers, the electroresponsive devices of this system will immediately respond and reëstablish the desired synchronous condition.

This invention is illustrated diagrammatically in the accompanying drawings, in which only so much of a multiplex telegraphic equipment has been shown as will be necessary to a clear understanding of the system.

Figure 1:
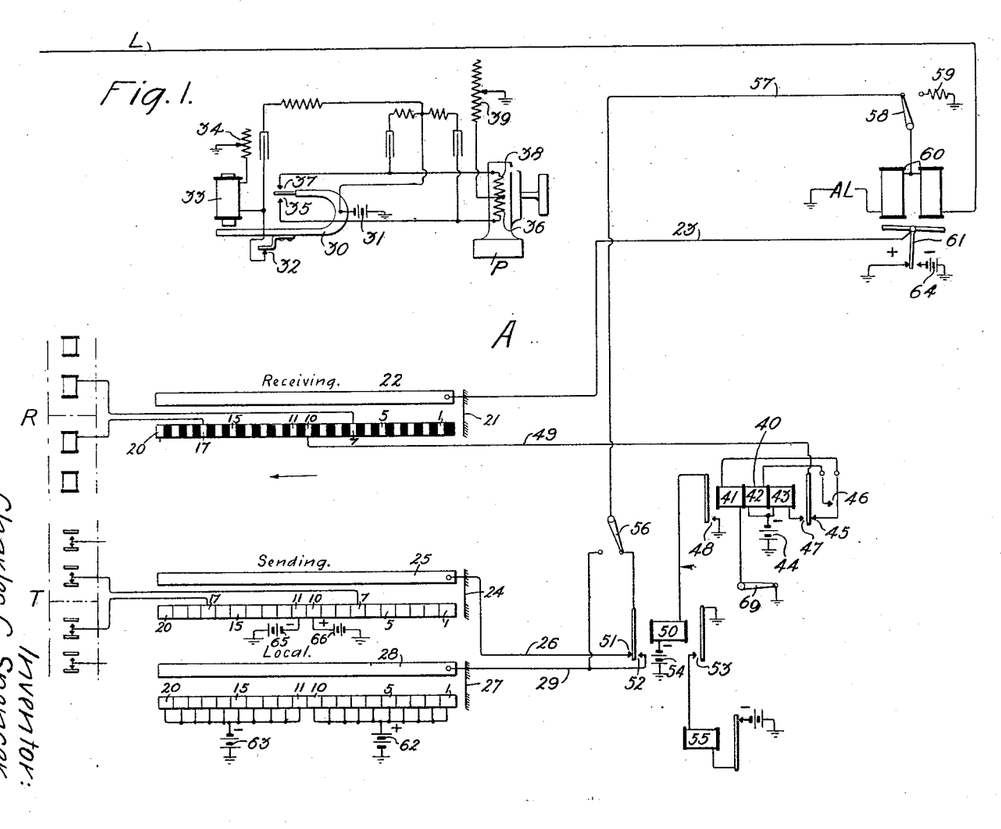
Figure 1, is shown an equipment suitable for rendering service at a so-called non-correcting station on a duplexed line circuit, while in the drawing.
Figure 2:
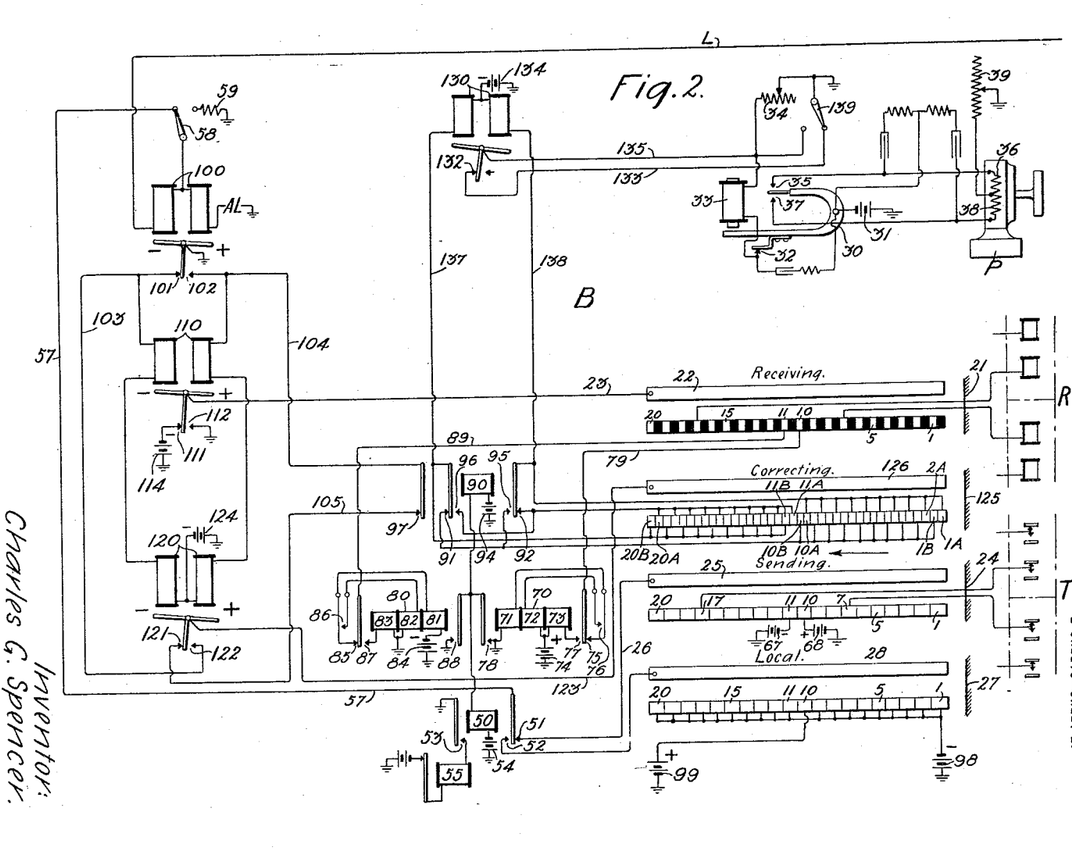
Fig. 2, is shown an equipment suitable for service at a correcting station on the same duplexed line.

In describing this system, the equipment shown in Fig. 1 of the drawing may be considered as located at a station indicated by the reference character A, which is joined by means of a line conductor L with the equipment shown in Fig. 2 of the drawing which is designated as located at a station B. At the station A, a distributer equipment comprises, as indicated, a receiving, a sending and a local section, and it will be understood that contactors or brushes 21, 24 and 27, respectively, of these distributer sections are adapted to be moved from right to left by means of a motor P. While these distributer sections should preferably be of a rotary type, they have, for convenience, been shown in a developed form in the drawing.

The motor P may be of the well-known La Cour or phonic-wheel type. The operating circuits of the motor P are under the control of a tuning fork 30, controlled by current from a grounded battery 31 by way of interrupter contacts 32, the winding of an electromagnet 33 and an adjustable resistance 34 to earth. Changes of action set up by the magnet 33 as controlled by vibration of the contact 32 cause the fork 30 to be continuously vibrated as well understood in the art. Under such vibrations, on the instant the contacts 35 are closed, a circuit may be traced from the battery 31 through these contacts and the winding 36 of the motor P and an adjustable resistance 39 to earth, and at the instant the contacts 37 are closed, current from the battery 31 will traverse a second winding 38 of the motor P and the resistance 39 to earth.

As well understood in the art, such alternate energization of the driving magnet windings 36 and 38 will cause the motor P to be rotated in phase with or at a speed which will be proportional to the frequency of the vibrations of the fork 30. The resistance 39 permits of adjustments to properly proportion the driving currents of the motor, while the resistance 34 permits similar adjustments to be made with respect to the operating currents of the fork controlling magnet 33. The respectively associated condensers and serially connected resistance units bridged on the vibrating contacts 32 and on the motor controlling contacts 35 and 37, serve to eliminate sparking effects at these contacts.

At the station B, the controlling circuits of the motor P differ from the circuits of the motor at the station A only in that the adjustable resistance 34 may be entirely shunted out, either through the contacts of a correcting relay 130 or by means of manually operated switch 139. At the station B, in addition to the receiving, sending and local distributer sections, similar to corresponding sections at A, there is provided an additional section which serves for correcting service. This correcting section forms a link in the control circuits whereby the relay 130 may be caused to close its contacts to establish a short circuit by way of the conductors 133 and 135 around the adjustable resistance 34, whereby increase of current strength through the magnet 33 will set up an increased amplitude in the vibrations of the fork 30 or otherwise mechanically affect the vibrating rate of this fork to vary the speed at which the motor P will be driven.

In the present arrangement segments 10 and 11 of the sending and receiving sections of the distributer at each station are employed for phase-finding or synchronizing operations while the remainder of the segments in these sections may be employed for either telegraphic or switching operations in connection with the control of signals as already mentioned. Accordingly, the devices T may either be considered as telegraph transmitting contacts or suitably controlled switching contacts, while the devices R may be considered as arranged in a manner suitable for the translation of telegraphic message impulses or for the control of switching circuits.

For purpose of description, let it now be assumed that the motor P at station A is operating at a relatively constant speed and driving the moving parts of the distributer at that station, while the motor P at the station B is operating the receiving parts of its associated distributer equipment in phase or synchronism with the distributer at the first station. During such operation, changes of current polarity, set up by the devices T at the station A, will affect the service segments, for example, the segments 7 or 17 of the sending section. Therefore, as the brush 24, in its regular travel successively sweeps over the service segments, connections are completed therefrom to a collector ring 25, thence by way of a conductor 26, normal contacts 51 of a switching relay 50, the blade of a switch 56, a conductor 57, the blade of a switch 58 to the outgoing connective point of the duplex equipment provided for the line L. From this point the transmitted currents divide equally, one portion traversing the left-hand winding of a polarized line relay 60, and an artificial line AL to earth, while the other portion traverses the right-hand winding of this relay and the line L to the station B, at which point it continues through the duplex circuits which comprise a line relay 100, a transmitting lead 57 and the circuits of an artificial line AL. Under changes of polarity for these transmitted currents, corresponding unbalance of the current conditions in the duplex circuits, as well understood in the art, cause the armature of the relay 100 to be reciprocated to correspondingly engage its contact stops 101 and 102 and thereby respectively complete circuits from a source of current 124. One of these circuits may be traced through the left-hand winding of a polarized leak relay 120 and a similar winding of a polarized signal relay 110 to earth at the armature of the relay 100, while the other circuit may extend through the right-hand winding of the relays 120 and 110 to the same earth connection at the armature of the relay 100, depending on whether the armature of the relay 100 closes its contacts 101 or its contacts 102. In this manner, the position of the armature of each relay 100, 110 and 120 will always correspond as to the position of their bias, one with another, and such bias will, of course, correspond with the polarity of the impulse received from the sending equipment at the station A by way of the line conductor L. Relay 100 accordingly controls the operation of the relays 110 and 120. In turn the relay 110 in establishing its contacts 111 connects a source of grounded current 114 by way of a conductor 23 with a collector ring 22 of the receiving section of the distributer, while the opposite contacts 112 of the relay 110 connect ground to this collector ring. In its regular travel, the brush 21 establishes circuit from the ring 22 to the associated segments whereby the receiving equipment R may be controlled. The purpose of the connections from the receiving segments 10 and 11 will appear presently.

Relay 120 acting through the correcting section of the distributer controls the operation of the correcting relay 130. In tracing this control, it is necessary to consider that the relay 120 is operated by the relay 100 and that conductors 103 and 104, which are connected in derived circuit relation from the opposite contact-stops of the relay 100, extend in reverse order to the contact-stops of the relay 120. Although the conductor 103 extends directly to the right-hand stop of the relay 120, the conductor 104 first passes through normal contacts 97 of a relay 90 and a conductor 105 to the left-hand contact stop of the leak relay 120. With this relation in mind and the relays positioned as shown, let it now be assumed that, in response to an impulse of positive current from the line L, the armature of the line relay 100 will be moved to close its contacts 102, thereby establishing a series circuit from the battery 124 through the right-hand windings of relays 120 and 110, thereby moving the armatures of these relays to close their contacts 122 and 112, respectively. At the instant the contacts 102 of the relay 100 were closed and before the current had built up sufficiently through the circuits traced, to operate the relays 120 and 110, a circuit is momentarily established which may be traced from a battery 134, the right-hand winding of the correcting relay 130, a conductor 138 and assuming that the brush 125 of the correcting section is at this instant over a segment 1A of the correcting section of the distributer, this circuit will be extended to a collector ring 126, thence by way of a conductor 123, the contacts 121 of the relay 120, the conductor 105, the contacts 97 of the relay 90, conductor 104, and the contacts 102 of the relay 100 to earth. Now, since the distributers at both stations are assumed to be operating in synchronism, this impulse of current will cause the armature of the relay 130 to continue on its idle or right-hand contact stop and therefore no change takes place at the speed varying circuits of the controlling fork 30.

Following this flash of current the armature of the relay 120 will of course immediately be moved to engage its contact stops 122, as already described. If now an impulse of negative current is received from the line L, the armature of the relay 100 will be moved to close its contacts 101, thereby permitting a flash of current from the battery 134, also to traverse the circuits already traced except that the brush 125 will have passed over the split or one-half length segments 1A and 1B and arrived at the segment 2A which, however, is connected common to the bus conductor 138 which is also connected to the segment 1A. This impulse of current accordingly traverses the brush 125, collector ring 126, conductor 123, contacts 122 of the leak relay 120, conductor 103 and the contacts 101 of relay 100 to earth. As in the case of the first impulse, this current impulse through the relay 130 is of short duration and will be terminated by the operation of the relay 120 to separate its contacts 122 and engage its contacts 121 in preparation for a next impulse from the line L. In case an impulse of one polarity is successively repeated from the line L, no action would, of course, take place at the relay 100, nor at either one of the relays 110, 120 or 130 as all of these relays would continue on the bias set up by the first impulse of such a series.

It will be noted that a segment A and a segment B of the correcting section of the distributer jointly occupy the same interval or space as that of one segment at either the sending or the local distributer sections. It may be mentioned that the segments at the receiving section are substantially equal to one-half the length of the segments of the sending section. The purpose of this is principally to provide that slight irregularities or incipient variations in the phase relation of the distributers at remote stations may take place without causing operation of the phase finding equipments. This will be clear from the fact that when the distributers are in perfect phase or exact synchronism one with another only the central or undistorted part of the signaling impulses shall be effective in controlling the operation of the receiving apparatus. It will also be noted that alternate ones of the twenty A segments at the correcting section are connected to the conductor 138 which leads to the right-hand winding of the relay 130, the first ten of the A segments 1 to 10 being connected directly to this conductor, while normally the last ten segments, 11 to 20, are connected by way of the normal contacts 92 of the relay 90 with the conductor 138. The B segments 1 to 10 are connected by way of the normal contacts 91 of the relay 90 with the conductor 137 which is connected through the left-hand winding of the correcting relay 130, while the B segments 11 to 20 are connected directly with the conductor 137. It will therefore, be clear that normally all of the A segments are joined through the right-hand winding of the correcting relay 130, while the B segments are connected through the left-hand winding of this relay. From the circuits already traced, it will be clear that so long as the distributer at the first station is in phase or synchronism with the distributer at the second station, only the segments A will be effective in completing the momentary circuits through the right-hand winding of the relay 130, coincident with the reception of impulses from the line L, and further, that during the time the brush 125 may be traversing any one of the B segments, no circuit will be established therefrom, due to the fact that before the brush 125 has reached a B segment, the relays 110 and 120 will have operated and opened the temporary flash circuit above described.

Let it now be assumed that the distributer at the station B has gained sufficiently to overlap the next advanced segment on the distributer at the station A, and that an impulse of positive current is received from the line L. The armature of the relay 100 will thereupon close its contacts 102, whereupon a circuit is momentarily established from the battery 134, left-hand winding of the relay 130, conductor 137, contacts 91 of the relay 90 and, assuming that brush 125 is over the segment 1B of the correcting section at this instant, this circuit will continue over the collector ring 126, conductor 123, contacts 121 of the relay 120, conductor 105, contacts 97 of the relay 90, conductor 104, contacts 102 to earth at the armature of the relay 100. At the relay 130, the armature will be moved to close its contact 132, thereby establishing the short circuit already traced around the adjustable unit 34. This increases the current in the magnet 33, thereby causing the tuning fork 30 to slow down and therefore to reduce the speed of the distributer driving motor P.

It will be understood that at the instant the impulses just traced for operating the relay 130 terminate, current from the battery 124, through the right-hand winding of each one of the relays 120 and 110 will cause their armatures to be respectively biased to the right-hand or positive positions. During such time as the distributers may remain out of phase, one or the other of successive inverse impulses received from the line L, will either initiate or continue to establish corresponding flashes of current through successive ones of the B segments, as the brush 125 continues through its path on the correcting section.

It may be pointed out that a source of positively poled current 66 and a source of negatively poled current 65 are connected to the sending segments 10 and 11, respectively, at the station A. Therefore, in case no signaling reversals of polarity happen to be sent out by the transmitting equipments T at the latter station, the brush 24 on successively passing over its segments 10 and 11 will cause the line relay 100 at the station B to operate and, in case the two distributers are still out of synchronism, thereby permit relay 130 to operate and slow down the motor P as described above. When the speed of the motor P has been reduced sufficiently to restore synchronism between the distributers of the two stations, impulses from the line L will reëstablish momentary flashes of current through the right-hand winding of the relay 130 by way of the segments A of the correcting distributer section to move the armature of this relay to separate its contacts 132 and thereby re-include the adjustable resistance 34 in series with the magnet 33. The motor P will thereupon run under the circuit condition shown in the drawing except that the contacts 132 of the relay 130 will stand separated.

In describing the operations whereby messages or signals may be transmitted from the station B to the station A, circuits may be traced from the transmitter equipment T to segments of the sending distributer section, as the segments 7 and 17 already mentioned. Therefore, as the brush 24 in its regular travel passes over these segments, current polarities in accordance with polarities prepared by the equipment T will traverse this brush, a collector ring 25, contacts 51 of a relay 50, a conductor 57, the blade of a switch 58 to the split or outgoing connective point of the duplex equipment formed by the line relay 100 and the artificial line AL. These currents divide through the relay 100 in the same manner as that already described for outgoing currents through the line relay 60 at the distant station. The line portion of these currents traverses the line L to the station A, thereby disturbing the duplex balance to cause the line relay 60 to bias in accordance with the polarities of the currents, as already described in connection with the station B. The armature 61 of this relay will accordingly be reciprocated in phase with the polarity of the impulses received from the distant station to either include a source of negatively poled battery 64 or a ground connection by way of a conductor 23 with a collector ring 22 of the receiving section of the distributer. From this ring the brush 21 successively connects these impulses with segments corresponding with the segments 7 and 17 connected to receiving devices R which may serve for telegraphic or other signaling service as mentioned. In connection with the synchronizing operations, it will be noted that at a moment the brush 24 at station B may be over the sending segment 10, the brush 21 will be over the corresponding receiving segment 10 at the station A. Positive current from a battery 68 may now be transmitted over the line L and cause the armature of the relay 60 to establish its ground connection, no circuit will be completed however at such instant by the brush 21 through the winding 41 of a relay 40, since this winding is connected through the blade of a switch 69 also to ground. In the opposite direction, it may also be pointed out that whenever the sending brush 24 at the station A is over its segment 10, the receiving brush 21 at the station B will also be over its corresponding segment 10; therefore, positive current from the battery 66 effects biasing of the line relay 100 at the station A to cause the relay 110 to close its contacts 112, but the ground connection thereby established with the collector ring 22 will be non-effective since a path which may be traced from the receiving segment 10 over a conductor 79, contacts 75 of a relay 70 and the winding 71 of this relay also connects to earth. Therefore, no action takes place under this impulse and the relay 70 also continues in the position in which it is shown. When the sending brush 24 at A arrives over the next segment 11, current from the negatively poled battery 65 will traverse the line circuits already traced, thereby causing the armatures of the relays 100 and 110 to assume their opposite or negative bias. For this position of the relays, a circuit may be traced from the battery 114 by way of the contacts 111 of the relay 110, conductor 23, collector ring 22, the receiving brush 21 which at this moment will be over segment 11, a conductor 89, contacts 85 of a relay 80 and the winding 81 of this relay to a negatively poled and grounded battery 84. Since the battery 84 and the battery 114 may be of equal potential, or one and the same battery, no action will result and the relay 80 will therefore continue in the position in which it is shown.

Let it now be assumed that due perhaps to a direct cause such as a short interruption of the line or other circuits, as will be understood by those skilled in the art, the distributer equipment at the station B has gained sufficiently on the distributer at the station A to allow the brushes to be on their respective segments 10 at the station A, while the brushes will be on their respective segments 11 at the station B. From the latter station, a circuit may therefore be traced from the negative battery 67, segment 11, sending brush 24 to the ring 25 from which it continues outwardly over the line circuit L and through the line relay 60 over the paths already traced. The armature of the relay 60 at A will accordingly be biased to connect the negative source of current 64 over the conductor 23, the ring 22, the receiving brush 21, segment 10, conductor 49, the contacts 45 of the relay 40, the winding 41 of this relay and the blade of the switch 69 to earth. The relay 40 thereby operated, establishes its contacts 46 to complete a self-locking circuit which may be traced from a negatively poled battery 44 through the winding 42 in series with the winding 41 of the relay 40 to the earth connection at switch 69. Separation of the contacts 45 of this relay, which are timed to act following the closing of the contacts 46, disconnects the segment 10 from the winding 41 and connects it over the contacts 47 through the winding 43 of this relay to the battery 44. A further circuit established by contacts of the relay 40 may be traced from a battery 54, the winding of the relay 50 and the contacts 48 of the relay 40 to earth. In operating, the relay 50 separates its contacts 51 to disconnect the sending ring 25 from the outgoing lead 57 and through the closing of its contacts 52 to establish a ring 28 of the local distributer section with the conductor 57, whereby outgoing signals are included with the line L. Closing of the contacts 53 of the relay 50, completes a circuit through an associated battery and a signal 55 which may be either of a visual or an audible type. Coincident with the transmission of the negative impulse from the station B whereby the relay 40 was operated, as just described, the advanced phase of the distributer at B permits a circuit to also be established from a source of positively poled current 66 at A by way of the segment 10, the brush 24, sending ring 25, thence outwardly over the line circuit L to the distant station over paths already traced. At the station B, this positive impulse will bias the line relay 100 to close its contacts 102 and in turn the armature of the relay 110 to close its contacts 112. A circuit may thereupon be traced from ground at the contacts 112 to the collector ring 22, thence over the receiving brush 21, segment 11, the conductor 89, the contacts 85 of the relay 80 and the winding 81 of this relay to earth through the battery 84. The relay 80 is typical of the relay 40 at the station A, and establishes a self-locking circuit which includes the windings 81 and 82 in series with its contacts 86 and the negatively poled battery 84, while the conductor 89, which extends to the receiving segment 11, is switched from the winding 81 to connect over the contacts 87 and the winding 83 of this relay to earth. Further circuits completed by the operation of the relay 80 may be traced from a battery 94, the winding of the relay 90, the contacts 88 of the relay 80 to earth, and from a battery 54 through the winding of the relay 50, also through the contacts 88 of the relay 80 to earth. The contacts 53 of the relay 50 cause a signal 55 to be operated, while the outgoing connective lead 57 of the line L is switched by the separation of contacts 51 of the relay 50 from the sending ring 25 to connect over the contacts 52 of the latter relay to the local ring 28. Operation of the relay 90 separated its contacts 92 to disconnect the first or A series of correcting segments 11 to 20 from the conductor 138 and to connect them over the contacts 96 of this relay with the conductor 137, while separation of the contacts 91 disconnects the B series of segments 1 to 10 from the conductor 137 and connects them by way of contacts 95 of the relay 90 with the conductor 138. Separation of the contacts 97 of the relay 90 opens the circuit between the conductors 104 and 105, thereby disconnecting the path normally established from the right-hand contact stop of the line relay 100 to the left-hand contact stop of the leak relay 120.

During the time the circuits are in the position in which they have been described, as the local brush 27 at the station A traverses its segments 11 to 20, current from the negative battery 63 will be transmitted outwardly over the line circuit L, and since all of the A and B segments 11 to 20 of the correcting section at the second station are joined one with another, as described, and with the conductor 137, it will be clear that the first negative impulse from the line, in moving the armature of the relay 100 and in turn the armatures of the relays 110 and 120 will have permitted a flash of current from the source 134 to pass through the lefthand winding of the correcting relay 130 by way of the brush 125 of the correcting section over the circuits already traced to earth at the armature of the line relay 100, thereby causing the relay 130 to close its contacts 132, whereby the short circuit already described will be completed around the adjustable resistance 34, whereupon the fork 30 will be influenced to retard the speed of the driving motor P. After passing from the joined local segments 11 to 20 and arriving over the joined segments 1 to 10, the local brush 27 at station A will connect a positive battery 62 with the outgoing circuits, and with the line L, thereby effecting opposite bias of the relay 100, and in turn a corresponding bias of the relays 110 and 120. Such consecutive positive impulses from the line will, however, be ineffective at the present time through the correcting relay 130, due to the fact that the separated position of the contacts 97 of the relay 90 have already severed the connection otherwise present between the right-hand contact stop of the relay 100 and the left-hand contact stop of the relay 120.

It will, therefore, be clear that so long as the relays 40 and 50 at station A and the relays 80, 90 and 50 at station B continue operated, the correcting relay 130 will continue to complete a short circuit whereby the speed of the motor P will be affected to restore synchronism. It may be pointed out that the relay 70 at the station B, is adapted to control the relays 50 and 90 in substantially the same manner in which they are controlled by the relay 80. The operating circuit for the relay 70 extends from the receiving segment 10 over the conductor 79, contacts 75 of the relay 70 and the winding 71 of this relay to earth, while the holding or locking circuit for this relay may be traced from a battery 74 through a winding 72 over the contacts 76 of this relay and its winding 71 to earth. In its operated position the relay 70 therefore establishes its self-locking circuit, separates its contacts 75 to disconnect the lead 79 from the winding 71, and to connect this lead over the contacts 77 through the winding 73 to earth through the battery 74, while the contacts 78 of this relay complete the circuits to retain or operate the relays 50 and 90.

It may be mentioned that the principal reason for employing two relays, as the relays 70 and 80, is that for a non-synchronized condition of the distributers at the two stations, either one or the other of these relays would first be operated, depending on the direction in which the distributers may be out of phase. It also works out that, in bringing the distributers into synchronism, certain conditions of signaling impulses may, or, the regular synchronizing impulses will, cause the relays 70 and 80 to be worked alternately, but in any event during non-synchronism of the remote distributers, one or the other of these relays will always be operated, thereby establishing the necessary circuit changes to control the synchronizing operations as described for the station B during periods the local brush 27 at this station may be in the zone covered by local segments 1 to 9 inclusive or 11 to 20 inclusive. A source of negatively poled current 98, common to each of these segments will accordingly be included with the outgoing lead of the line L to retain the armature of the relay 60 biased to connect the negatively poled battery 64 with the receiving ring 22 and since this battery is of equal potential and like polarity with respect to the battery 44 at the relay 40, no circuit may be completed through this relay at such times as the receiving brush 21 at station A may arrive over the associated segment 10. It will be noted, however, that a source of positively poled current 99 is connected to the local segment 10 at the station B. Therefore, at such moment as the synchronizing operations may have brought the distributers of the two stations into phase, the local brush 27 will be over its segment 10 at the instant that the receiving brush 21 at the station A is over its corresponding segment 10. A positive impulse from the station B will thereupon cause the armature 61 of the relay 60 at station A to establish its ground connection, whereupon a circuit may be traced from the battery 44, the winding 43 of the relay 40, the contacts 47 of this relay, the conductor 49, segment 10, brush 21, ring 22, conductor 23 to the ground at the contacts of the relay 60. The connective relation of the windings at the relay 40 are such that the current just traced through the winding 43 will act differentially with respect to the holding current present in the windings 41 and 42 in a manner to equalize the effects and cause this relay to restore. This operation disconnects the relay 50 whereby the outgoing lead for the line L will be switched from the ring 28 of the local section to the ring 25 of the sending section of the distributer, and the signal 55 will also be disconnected. Following the restoring of the relay 40 and when the brushes at each station have arrived over the respective segments 11, the sending brush 24 at station A will connect the negative battery 65 with the outgoing lead of the line L. At the distant station this current impulse will cause the line relay 100 to close its contacts 101 and in turn close the contacts 111 of the relay 110. A circuit may thereupon be traced from ground, through the winding 83 of the relay 80, contact 87 of this relay, conductor 89, segment 11, receiving brush 21, ring 22, conductor 23, to the battery 114 at the contacts 111 of the relay 110 to differentially set up current in the winding 83 with respect to the windings 81 and 82 of the relay 80 in a manner similar to that already described in connection with the relay 40. The restoring of the relay 80 thereupon disconnects the relay 50, whereby the outgoing lead of the line L will be switched from the ring 28 of the local section to the ring 25 of the sending section of the distributer. The relay 50 also disconnects the signal 55. The releasing of the relay 90 reëstablished all of the A segments of the correcting section with the lead 138 of the correcting relay 130 and all of the B segments with the conductor 137 of the correcting relay, and also closes the contacts 97. At the same instant that the other restoring operations were taking place, the correcting brush 125 was present over its A segment 11 and accordingly the arrival of the negative impulse from the segment 11 of the sending distributer at the station A will have permitted a flash of current from the battery 134 over the right-hand winding of the correcting relay 130, the segment 11A, the brush 125, thence over the circuits already traced through the contacts 122 of the relay 120 (on its right-hand bias at the instant the negative impulse arrived from the station A), and the contacts 101 of the relay 100 to earth. It may be mentioned that in case the various successive operations of restoring should not occur with sufficient rapidity to permit the flash of correcting current to take place through the relay 130, as just traced, at the moment the brush 125 was over the correcting segment 11A, a flash of current would nevertheless occur through the relay 130 at the instant the correcting brush sweeps over a next segment common to the segment 11A coincident with the reception of a positive impulse from the station A. This positive impulse may occur from any of the message service segments 12 to 20 or 1 to 9 of the sending section of the distributer at the station A, or a positive impulse will eventually be transmitted at the instant the brush 24 of this distributer section reaches the phase finding segment 10.

From the foregoing description, it will be obvious that the negative battery 67 at the sending section station B will act to operate the phase-finding relay 40 at the station A, in case the distributers should get out of synchronism and also that the battery 99 connected with the segment 10 of the local section or the battery 68 connected with segment 10 of the sending section at station B will establish the restoring of the relay 40 at such time as the phase-finding equipment may bring the distributers into synchronism.

In a corresponding manner the batteries 66 and 65 respectively, connected to the sending segments 10 and 11 at the station A, may respectively cause the operation of the phase-finding relays 70 and 80 at the station B, in case the distributers are out of phase or that current from the battery 66 may cause the relay 70 to release, while current from the battery 65 may cause the relay 80 to release, all in the operations whereby automatic phase-finding is carried out.

It may be further pointed out that during the time the equipment at the station A is switched from the regular sending section to the local section of the distributer in the operations of phase-finding, that so long as the brush 27 is over the commonly connected segments 1 to 10, the positively poled battery 62 included therewith, will effect the receiving devices at the station B to either operate the relay 70 or to deënergize the relay 80 and conversely during the time the brush 27 is over the commonly connected segments 11 to 20, the negatively poled battery 63 will establish operations at the station B to either release the relay 80 or to operate the relay 70.

From the foregoing description, it will be obvious that in order to establish synchronous multiplex service between the stations A and B, it would only be necessary for attendants at these stations to close circuits for operating the distributing motors P, following which, the automatic phase-finding devices would first establish isochronous relation and then synchronous relation between the remote distributers, and further, that in case the distributers should get out of synchronism, one with the other, the phase-finding equipment would immediately become operative to reëstablish the desired synchronous condition.

At the station A, the manual switch 56 may be employed if desired in substitution of the automatic phase-finding equipment thereat, in transferring from the sending to the local distributer sections for synchronizing operations. It may also be pointed out that the switch 58 and an associated resistance unit 59 at each station are provided for use in connection with the operations of establishing adjustments of the artificial line device in order to secure balance of the duplex equipments, the resistance 59 serving as a substitute or compensating resistance to represent the resistance of the transmitting batteries and other devices which may be included therewith.

What is claimed is:

1. In a system of synchronous telegraphy, a plurality of stations, distributer equipment at each station, means controlled through said distributers for establishing signaling operations between said stations, phase-finding equipment, and means controlled by said distributer equipments for substituting operation of said phase-finding equipment for said signaling operations.

2. In a synchronizing system, a plurality of rotatory equipments, means associated with said rotatory equipments for establishing changes of current polarities between said equipments to effect signaling, phase-finding equipment rendered automatically operative by a non-synchronous condition between said rotatory equipments, and means controlled by said phase-finding equipment for establishing predetermined order of current polarities between said rotatory equipments in substitution of polarities employed for signaling.

3. The method of automatically establishing synchronism between a plurality of rotatory systems which consists in providing equipment under the control of said rotatory systems to establish and maintain a predetermined order of current polarities effective between said systems until they are in synchronism, one with another.

4. The method of automatically restoring synchronism between a plurality of rotary systems which consists in providing equipment responsive to a non-synchronous condition between said systems to establish a predetermined order of current polarities between said systems which will continue until operations controlled thereby will have reëstablished synchronism between said rotary systems.

5. In a synchronous telegraph system, a line circuit, a plurality of stations on said line, distributer equipment at each station, motor means for each distributer equipment, means active with said distributer equipments for signaling between said stations, electroresponsive means rendered operative by a non-synchronous condition between said distributer equipments for establishing a predetermined order of current polarities in substitution of said signaling between said stations, and means controlled by said current polarities for affecting the speed of the motor means of one of said distributer equipments.

6. In a system of synchronous telegraphy, a first and a second station, distributer equipment at each station, sources of current, a plurality of relays at each station, means controlled by said distributers for rendering said relays responsive to a non-synchronous condition between said distributer equipments, a line circuit joining said stations, line relays at each station, a correcting relay at said second station, a plurality of circuits operated by said line relay for controlling said correcting relay, and means controlled by said plurality of relays at said second station for disabling certain of the control circuits of said correcting relay.

7. In a synchronizing system, a first and a second distributing equipment, a line joining said equipments, a first relay connected from said first distributer, two relays connected with said second distributer, means controlled by a non-synchronized condition of said distributers to operate said first relay and to continue operated one or the other of the two relays at the second distributer, and means controlled by said relays for restoring synchronism between said distributers.

8. In a synchronizing system, a first and a second rotatory equipment, means for electrically joining said equipments, a source of current, switching means controlled by each of said equipments, a plurality of compound wound relays controlled by said switching means, means responsive to non-synchronism between said equipments to maintain one of said relays operated at each equipment, and means controlled by said relays to establish predetermined current polarities between said systems, and means responsive to said current polarities to synchronize said rotatory equipments one with another.

9. In a system of synchronous telegraphy, a first and a second station, a line circuit joining said stations, distributer equipment at each station, sources of current, a line relay at each station, a correcting section at the distributer at the second station, a correcting relay, a plurality of operating circuits for said correcting relay jointly controlled by the line relay and said correcting section, and means controlled by a non-synchronized condition between the distributers of said stations for partially disabling the operating circuits of said correcting relay.

10. In a system of synchronous telegraphy, a first and a second station, a line circuit joining said stations, distributer equipments at said stations, source of current, means controlled through the said distributers for signaling between said stations, a compound wound relay connected with the distributer at the first station, two compound wound relays connected with the distributer at the second station, means effective under a non-synchronized condition of said distributers to operate the compound wound relay at the first station and to cause one or the other of the compound wound relays to be operated at the second station, means controlled by said compound wound relays for establishing predetermined orders of current polarities between said stations, means responsive to said polarities for establishing synchronism between said distributers, and means controlled by a synchronized condition of said distributers to restore said compound wound relays.

11. In a system of synchronous telegraphy, a plurality of stations, distributer equipment at each station, means for operating said distributers in synchronism, means controlled through said distributers for signaling between said stations, a plurality of relays, means controlled by a non-synchronized condition between said stations to establish predetermined current polarities in substitution of signaling between said stations, signals controlled by said relays for indicating a non-synchronous condition, and means controlled by said predetermined polarities for establishing said distributers in synchronism one with another.

12. In a system of synchronous telegraphy, a first and a second distributer equipment, means controlled through said distributer equipments for telegraphing therebetween, correcting equipment comprising a plurality of circuits for regulating the operation of one of said distributer equipments, a plurality of relays, means controlled by a non-synchronous condition of said distributer equipments for operating said relays, and means controlled by said relays for varying the circuit connections of said correcting equipment.

In witness whereof I hereunto subscribe my name this 28th day of December, A. D. 1917.

CHARLES G. SPENCER.